United States Patent [19]
Kitajima et al.

[11] Patent Number: 5,170,763
[45] Date of Patent: Dec. 15, 1992

[54] AIR-FUEL RATIO CONTROL SYSTEM FOR INTERNAL COMBUSTION ENGINES

[75] Inventors: Shinichi Kitajima; Toshiyuki Suga, both of Wako; Yoshihiko Kobayashi, Haga, all of Japan

[73] Assignee: Honda Giken Kogyo Kabushiki Kaisha, Tokyo, Japan

[21] Appl. No.: 813,623

[22] Filed: Dec. 26, 1991

[30] Foreign Application Priority Data

Dec. 28, 1990 [JP] Japan .................................. 2-417323
Oct. 11, 1991 [JP] Japan .................................. 3-292226
Oct. 11, 1991 [JP] Japan .................................. 3-292227

[51] Int. Cl.$^5$ ............................................. F02M 51/00
[52] U.S. Cl. ................................... 123/491; 123/1 A; 123/494
[58] Field of Search ............... 123/491, 1 A, 494, 575, 123/479, 685; 73/116

[56] References Cited

U.S. PATENT DOCUMENTS

| | | | |
|---|---|---|---|
| 4,913,099 | 4/1990 | Ota | 123/1 A |
| 4,942,848 | 7/1990 | Terasaka | 123/491 |
| 4,957,087 | 9/1990 | Ota | 123/479 |
| 4,989,570 | 2/1991 | Kuribara et al. | 123/494 |
| 4,995,367 | 2/1991 | Yamaguchi et al. | 123/494 |
| 5,005,402 | 4/1991 | Pischinger et al. | 123/1 A |
| 5,014,670 | 5/1991 | Mitsumoto | 123/494 |
| 5,044,344 | 9/1991 | Tuckey et al. | 123/497 |
| 5,056,490 | 10/1991 | Kashima | 123/1 A |
| 5,074,271 | 12/1991 | Suzuki et al. | 123/491 |
| 5,092,305 | 3/1992 | King | 123/575 |

FOREIGN PATENT DOCUMENTS 1-244133 9/1989 Japan .................................. 123/491

*Primary Examiner*—Raymond A. Nelli
*Attorney, Agent, or Firm*—Armstrong & Kubovcik

[57] ABSTRACT

An air-fuel ratio control system for an internal combustion engine using an alcohol blended fuel, in which an alcohol concentration-dependent correction coefficient for use in calculating an amount of fuel supplied to the engine is calcuated in response to concentration of alcohol in the fuel defected by an alcohol concentration sensor. An average value of the correction coefficient is calcuated depending on operating conditions of the engine. The amount of fuel supplied to the engine is calculated by the use of the average value of the correction coefficient to thereby control the air-fuel ratio of an air-fuel mixture supplied to the engine.

19 Claims, 5 Drawing Sheets

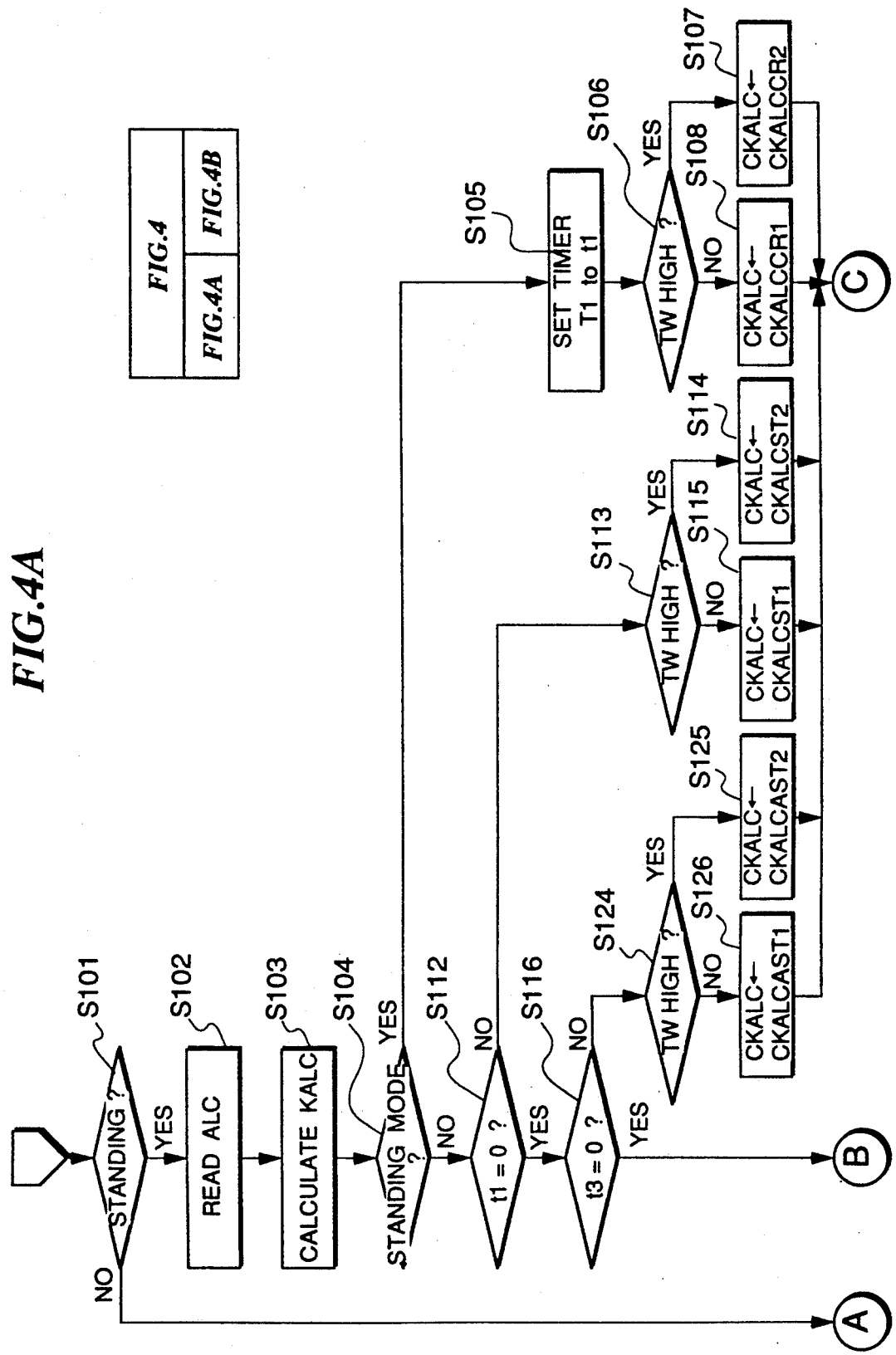

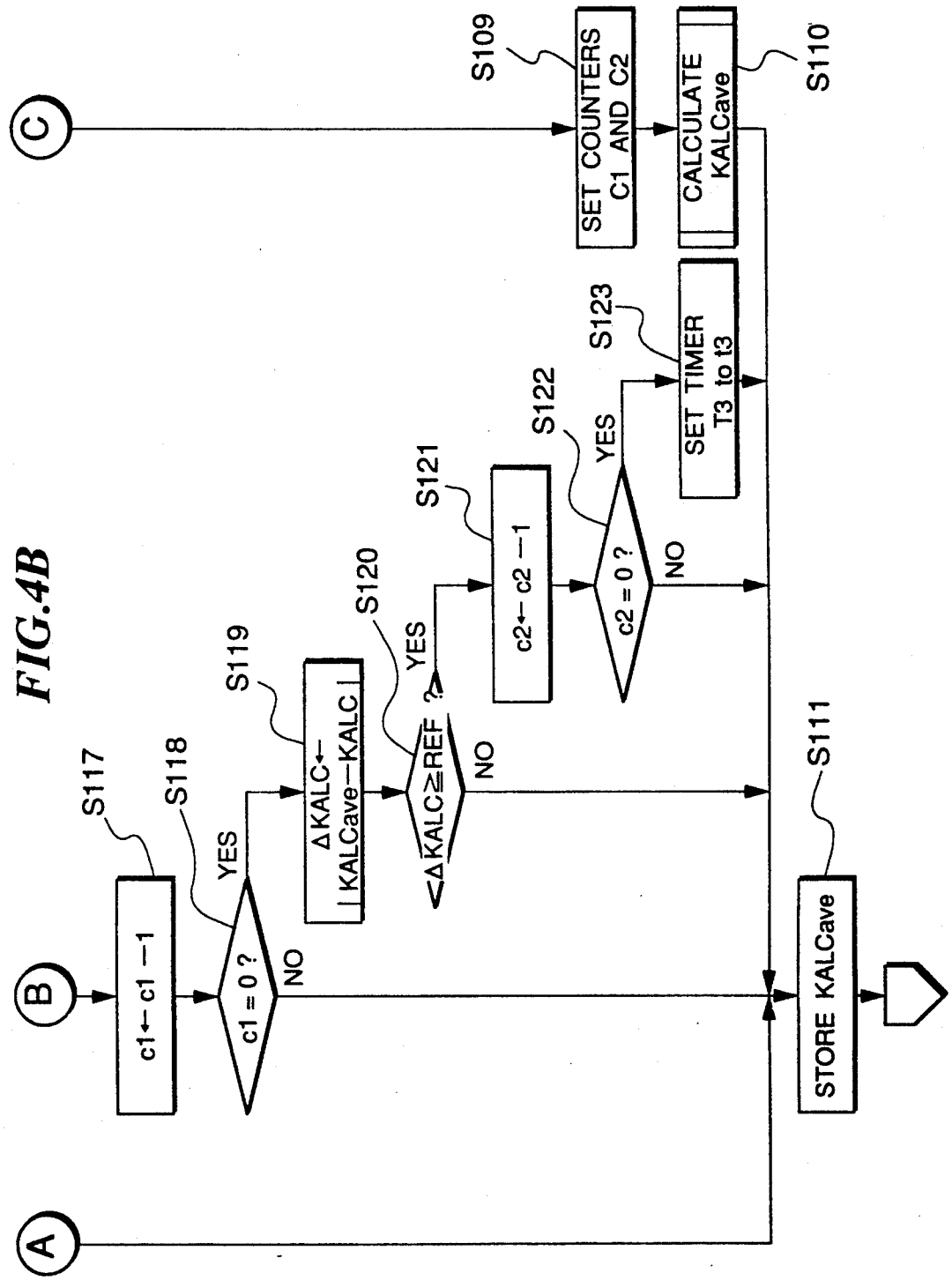

AIR-FUEL RATIO CONTROL SYSTEM FOR INTERNAL COMBUSTION ENGINES

BACKGROUND OF THE INVENTION 1. (Field of the Invention)

This invention relates to an air-fuel ratio control system for internal combustion engines, and more particularly to an air-fuel ratio control system for internal combustion engines in which an alcohol blended fuel is used.

2. (Prior Art)

Recently, internal combustion engines have been intensively studied and developed, which use a fuel containing alcohol such as methanol, in order to reduce the amount of noxious exhaust gas components such as NOx as well as to save the cost of fuel used.

Conventionally, in an internal combustion engine of this kind, the air-fuel ratio of an air-fuel mixture supplied to the engine is controlled to a stoichiometric air-fuel ratio in response to the concentration of alcohol present in the fuel, detected by an alcohol concentration sensor mounted in the engine, as proposed e.g. by Japanese Provisional Patent Publication (Kokai) No. 1-244133.

However, according to the conventional air-fuel ratio control method, if output from the alcohol concentration sensor (i.e. the detected value of alcohol concentration) undergoes a change due to spark noise, drift, etc. to deviate from the actual value of alcohol concentration, especially at the start of the engine, the air-fuel ratio of the mixture is controlled to a value deviated from the stoichiometric value in response to the output from the alcohol concentration sensor, which results in degraded exhaust emission characteristics.

Further, a simple way to control the air-fuel ratio of a mixture containing alcohol would be to detect the concentration of alcohol present in the fuel by an alcohol concentration sensor within a predetermined time period after the start of the engine to determine an alcohol concentration-dependent correction coefficient for use in calculation of the amount of fuel to be supplied to the engine.

However, according to this method, since the alcohol concentration-dependent correction coefficient is determined soley based on values of the concentration of alcohol in the fuel detected within the predetermined time period after the start of the engine, there is a fear that the air-fuel ratio is improperly controlled, since the concentration of alcohol in the fuel can vary due to refueling or depending on the mixed state of alcohol and gasoline in the fuel tank so that the determined value of the alcohol concentration-dependent correction coefficient becomes different from a value thereof corresponding to the actual alcohol concentration.

Further, the alcohol concentration sensor is usually mounted in the wall of a fuel supply pipe of the engine. As a result, if the engine is restarted when it is hot, hot fuel which has been heated by the hot fuel supply pipe of the engine is first presented to the alcohol concentration sensor, and then cold fuel newly flowing out of the fuel tank is presented to same, which can result in that the output level of the alcohol concentration sensor temporarily becomes deviated from a proper output level due to temperature-dependent characteristics of the alcohol concentration sensor. Consequently, the detected value of alcohol concentration becomes deviated from a correct value, and accordingly the alcohol concentration-dependent correction coefficient determined based on the deviated detected value of alcohol concentration does not correspond to the actual value of the alcohol concentration. Therefore, the engine is not properly controlled, resulting in degraded exhaust emission characteristics.

SUMMARY OF THE INVENTION

It is a first object of the invention to provide an air-fuel ratio control system for an internal combustion engine using an alcohol blended fuel, which is capable of preventing deviation in the air-fuel ratio due to fluctuations of output from an alcohol concentration sensor caused by disturbances such as noise and drift, to thereby avoid degradated exhaust emission characteristics.

It is a second object of the invention to properly control the air-fuel ratio even when the concentration of alcohol in the fuel changes.

It is a third object of the invention to properly control the air-fuel ratio even when the temperature of the engine is high.

To attain the objects, the present invention provides an air-fuel ratio control system for an internal combustion engine using an alcohol blended fuel, comprising:

alcohol concentration-detecting means for detecting concentration of alcohol in the fuel;

correction coefficient-calculating means for calculating a correction coefficient for the use in calculating an amount of fuel supplied to the engine, in response to the concentration of alcohol detected by the alcohol concentration-detecting means;

engine operating condition-detecting means for detecting operating conditions of the engine;

average value-calculating means for calculating an average value of the correction coefficient, depending on the operating conditions of the engine detected by the engine operating condition-detecting means; and air-fuel ratio control means for calculating the amount of fuel supplied to the engine by the use of the average value of the correction coefficient calculated by the average value-calculating means to thereby control the air-fuel ratio of an air-fuel mixture supplied to the engine.

Preferably, the average value-calculating means calculates the average value of the correction coefficient when the engine is being started and before a predetermined time period elapses after the engine has been started.

More preferably, the average value-calculating means calculates the average value of the correction coefficient at a calculating speed which is set to different values depending on whether the engine is being started or has been started.

Further preferably, the calculating speed of the average value of the correction coefficient is set to a higher value when the engine is being started than after the engine has been started.

To attain the second object of the invention, the air-fuel ratio control system further includes alcohol concentration change-determining means for determining whether or not the concentration of alcohol detected by the alcohol concentration-detecting means has changed after a predetermined time has elapsed after the engine was started, and when the alcohol concentration change-determining means determines that the concentration of alcohol has changed, the average value-calculating means calculates again the average value of the correction coefficient by the use of values of the correction coefficient calculated by the correction coefficient-calculating means in response to new values of the conentration of alcohol detected by the alcohol concentration-detecting means.

Preferably, the alcohol concentration change-determining means determines that the concentration of alcohol has changed when a difference between a present value of the correction coefficient calculated by the correction coefficient-calculating means in response to a present value of the concentration of alcohol detected by the alcohol concentration-detecting means and the average value of the correction coefficient is equal to or larger than a predetermined value.

More preferably, the alcohol concentration change-determining means finally determines that the concentration of alcohol has changed when the determination thereof has been repeated a predetermined number of times.

To attain the third object of the invention, the air-fuel ratio control system further includes engine tempersature-detecting means for detecting a temperature of the engine, and the calculating speed of the average value of the correction coefficient is changed depending on the temperature of the engine detected by the engine temperature-detecting means.

Preferably, the calculating speed of the average value of the correction coefficient is set to a higher value when the temperature of the engine detected by the engine temeprature-detecting means is equal to or higher than a predetermined value than when the temperature of the engine is lower than the predetermined value.

For example, the temperatue of the engine is detected by an engine coolant temperature sensor for detecting the temperature of coolant in the engine.

The above and other objects, features, and advantages of the invention will become more apparent from the ensuing detailed description taken in conjunction with the accompanying drawings.

BRIEF DESCRIPTION OF THE DRAWINGS

FIGS. 4, 4A, and 4B are flowcharts of a program for calculating an alcohol concentration-dependent correction coefficient KALC according to a second embodiment of the invention.

DETAILED DESCRIPTION

The invention will now be described in detail with reference to the drawings showing embodiments thereof.

Figure 1:
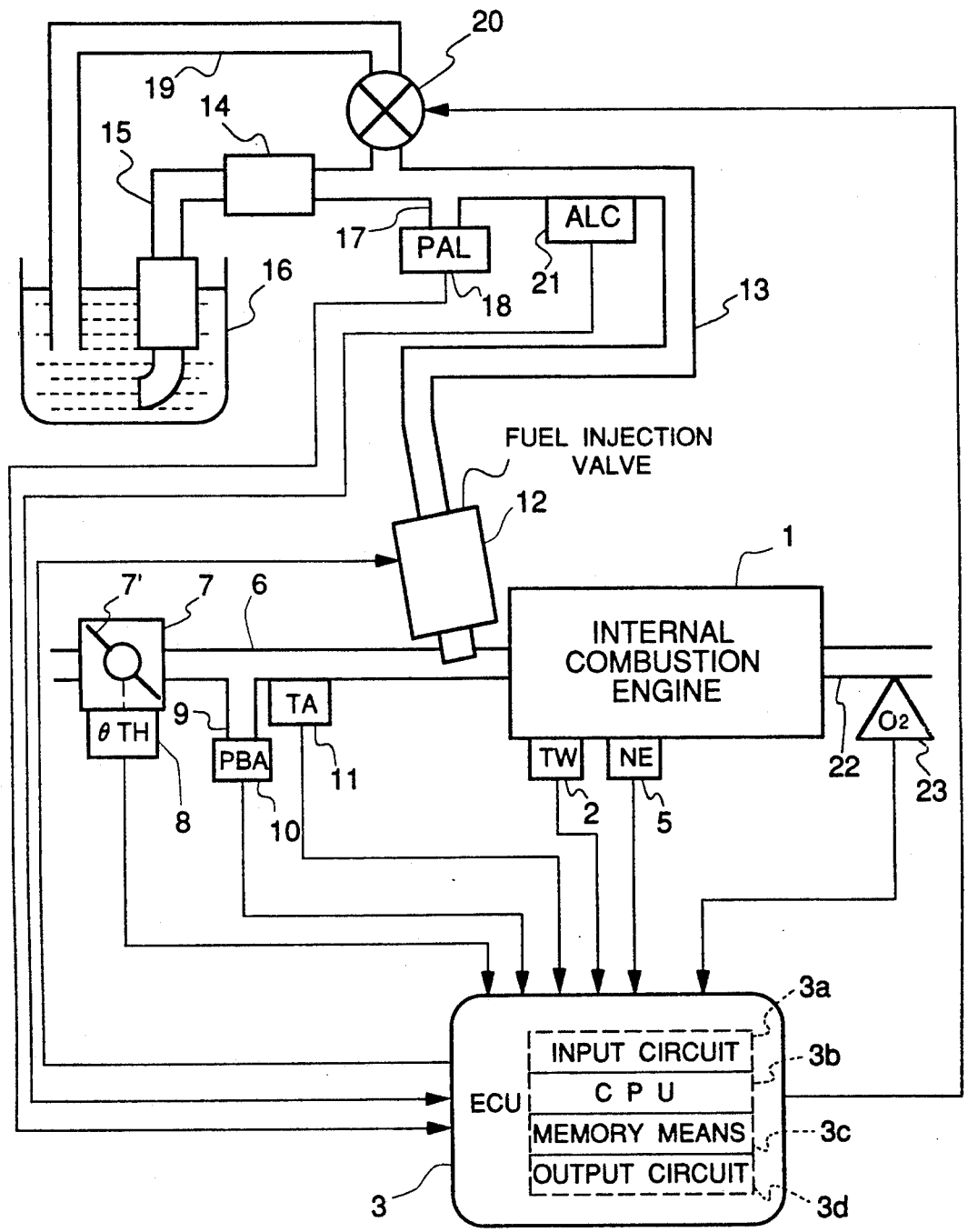
FIG. 1 is a schematic diagram of the whole arrangement of an air-fuel ratio control system for an internal combustion engine according to the invention.

Referring first to FIG. 1, there is shown the whole arrangement of an air-fuel ratio control system for an internal combustion engine according to the invention.

In the figure, reference numeral 1 generically designates an internal combustion engine having e.g. four cylinders (hereinafter simply referred to as the "engine"). An engine coolant temperature (TW) sensor 2, which may be formed of a thermistor or the like, is mounted in a coolant passage filled with engine coolant and formed within a cylinder wall of the cylinder block of the engine 1. The TW sensor 2 detects the temperature of engine coolant, and supplies an electric signal indicative of the detected engine coolant temperature to an electronic control unit (hereinafter referred to as the "ECU") 3.

An engine rotational speed (NE) sensor 5 is arranged in facing relation to a camshaft or a crankshaft of the engine, neither of which is shown. The NE sensor 5 generates a pulse as a TDC signal pulse at each of predetermined crank angles whenever the crankshaft rotates through 180 degrees, the pulse being supplied to the ECU 3.

Arranged across an intake pipe 6 of the engine 1 is a throttle body 7 accommodating a throttle valve 7', to which is connected a throttle valve opening ($\theta$TH) sensor 8 for generating an electric signal indicative of the sensed throttle valve opening and supplying same to the ECU 3.

Further, an intake pipe absolute pressure (PBS) sensor 10 is provided in communication with the interior of the pipe 6 via a conduit 9 at a location downstream of the throttle valve 7'. The PBA sensor 10 is electrically connected to the ECU 3, and supplies an electric signal indicative of the sensed absolute pressure PBA in the intake pipe 10 to the ECU 3.

An intake air temperature (TA) sensor 11 is inserted into the intake pipe 6 at a location downstream of the conduit 9 for supplying an electric signal indicative of the sensed intake air temperature to the EUC 3.

Fuel injection valves 12 are each provided for each cylinder, not shown, and arranged in the intake pipe 6 between the engine and throttle valve 7' and at a location slightly upstream of an intake valve, not shown.

The fuel injection valves 12 are connected to a fuel pump 14 via a first fuel supply pipe 13, and electrically connected to the ECU 3 to have their valve opening periods controlled by driving signals therefrom. The fuel pump 14 is connected to a fuel tank 16 through a second fuel supply pipe 15.

A fuel pressure (PAL) sensor 18 is provided in communication with the interior of the first fuel supply pipe 13 via a conduit 17 at a location downstream of the fuel pump 14. The PAL sensor 18 is electrically connected to the ECU 3 for supplying an electric signal indicative of the sensed fuel pressure thereto.

A bypass pipe 19 branches from the first fuel supply pipe 13 at a location between the fuel pump 14 and the conduit 17 to return part of an alcohol blended fuel from the fuel pump 14 to the fuel tank 16. More specifically, responsive to output from the PAL sensor 18 the ECU 3 supplies a control signal to a pressure-regulating valve 20 provided across the bypass pipe 19 to control its valve opening such that the pressure of fuel supplied from the fuel tank 16 to the fuel injection valves 12 is properly controlled.

Further, an alcohol concentration (ALC) sensor 21 is inserted into the first fuel supply pipe 13 at a location downstream of the conduit 17. The ALC sensor 21 is electrically connected to the ECU 3 for supplying an electric signal indicative of the sensed concentration of alcohol present in the fuel to the ECU 3.

An exhaust gas ingredient concentration sensor 23 (e.g. an $O_2$ sensor) is mounted in an exhaust pipe 22 for detecting the concentration of oxygen gas present in exhaust gases emitted from the engine and supplying an electric signal indicative of the sensed oxygen concentration.

The ECU 3 comprises an input circuit 3a having the functions of shaping the waveforms of input signals from various sensors, shifting the voltage levels of sensor output signals to a predetermined level, converting analog signals from analog-output sensors to digital signals, and so forth, a central processing unit (hereinafter referred to as the "CPU") 3b, memory means 3c comprised of a ROM storing various operational programs which are executed by the CPU 3b, predetermined maps and tables, etc. and a RAM for storing results of calculations etc., and an output circuit 3d for supplying driving signals to the fuel injection valves 12 and the pressure-regulating valve 20.

The CPU 3b operates in response to signals from the above-mentioned sensors as engine operating condition parameter signals to determine operating conditions in which the engine 1 is operating, and calculates, based on the determined operating conditions, the valve opening period or fuel injection period $T_{OUT}$ over which the fuel injection valves 6 are to be opened, by the use of an equation (1) or (2) given below:

First, when the engine is in a starting mode, the fuel injection period $T_{OUT}$ is calculated by the following equation (1):

$$T_{OUT} = TiCR \times KNE \times KALCCR \times K_1 \times K_2 \ldots (1)$$

where Ti represents a basic value of the fuel injection period over which the fuel injection valves 12 are to be opened when the engine is in the starting mode, the basic value being read from a TiCR map according to the engine coolant temperature TW. KNE is a coefficient read from a KNE table according to the engine rotational speed NE.

KALCCR represents an alcohol concentration-dependent coefficient applied when the engine is in the starting mode, which is read from a KALCCR table according to the alcohol concentration detected by the ALC sensor. As described hereinbelow, actually, an average value thereof is applied to the equation (1).

$K_1$ and $K_2$ represent other correction coefficients and correction variables, respectively, which are determined according to battery voltage etc.

When the engine is in a basic mode after completion of the start of the engine, the fuel injection period $T_{OUT}$ is calculated by the following equation (2):

$$T_{OUT} = Ti \times KAL \times K_3 \times K_4 \ldots (2)$$

where Ti represents a basic value of the fuel injection period over which the fuel injection valves 12 are to be opened when the engine is in the basic mode, the basic value being read from a Ti map according to the engine rotational speed NE and the intake pipe absolute pressure PBA.

KALC represents an alcohol concentration-dependent correction coefficient applied when the engine is in the basic mode. When the engine is in a steady operating condition in the basic mode, it is read from a KALC table according to the alcohol concentration detected by the ALC sensor, whereas when the engine is accelerating in the basic mode, it is read from a KALCT table according to the alcohol concentration detected by the ALC sensor. Also in the basic mode, an average value of KALC is applied as KALC to the equation (2).

$K_3$ and $K_4$ represent other correction coefficients and correction variables, respectively, which are calculated based on throttle valve opening $\Theta TH$ and other parameters indicative of engine operating conditions to such values as to optimize characteristics of the engine such as fuel consumption and accelerability.

The CPU 3b forms correction coefficient-calculating means for calculating the alcohol concentration-dependent correction coefficients KALCCR, KALC, and KALCT (hereinafter generically referred to as "KALC" unless otherwise specified) based on the correction coefficient tables (KALCCR table, KALC table, and KALCT table) according to the concentration of methanol detected by the ALC sensor 21, average value-calculating means for calculating an average value of values of the correction coefficient KALC obtained by the correction coefficient-calculating means, and air-fuel ratio of an air-fuel mixture supplied to the engine in response to the average value of the correction coefficient KALC.

The correction coefficient tables to be used in calculating the correction coefficient KALC are stored in the memory means 3c (ROM) and are selected for use according to operating conditions of the engine.

Figure 2:
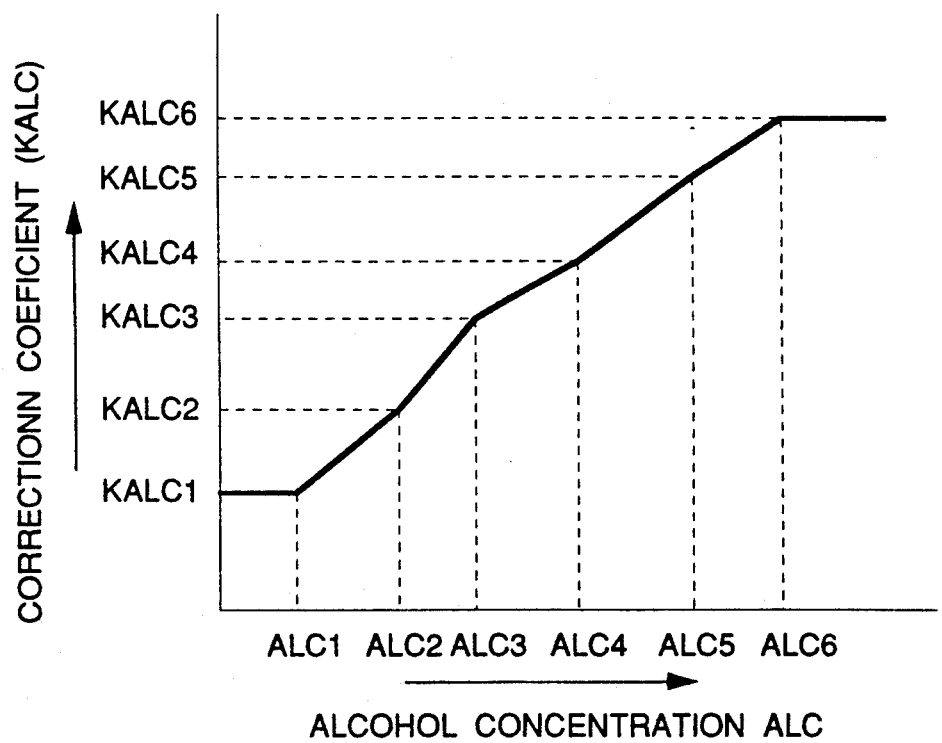
FIG. 2 is a diagram showing an example of a KALC table for calculating an alcohol concentration-dependent correction coefficient KALC.

FIG. 2 shows an example of the KALC table used when the engine is in a steady operating condition in the basic mode. In the figure, the abscissa represents values of the alcohol concentration detected by the ALC sensor 21 and the ordinate represents values of the correction coefficient KALC.

As is apparent from the figure, in the KALC table, a plurality of predetermined methanol concentration values ALC1, ALC2, . . . ALC6 correspond to a plurality of predetermined correction coefficient values KALC1, KALC2, . . . KALC6, respectively. When the methanol concentration assumes a value other than the predetermined values, the correction coefficient KALC is obtained by linear interpolation. In addition, the KALCRR table and KALCT table, which are applied respectively when the engine is in the starting mode or when it is accelerating in the basic mode, are similarly arranged.

Figure 3:
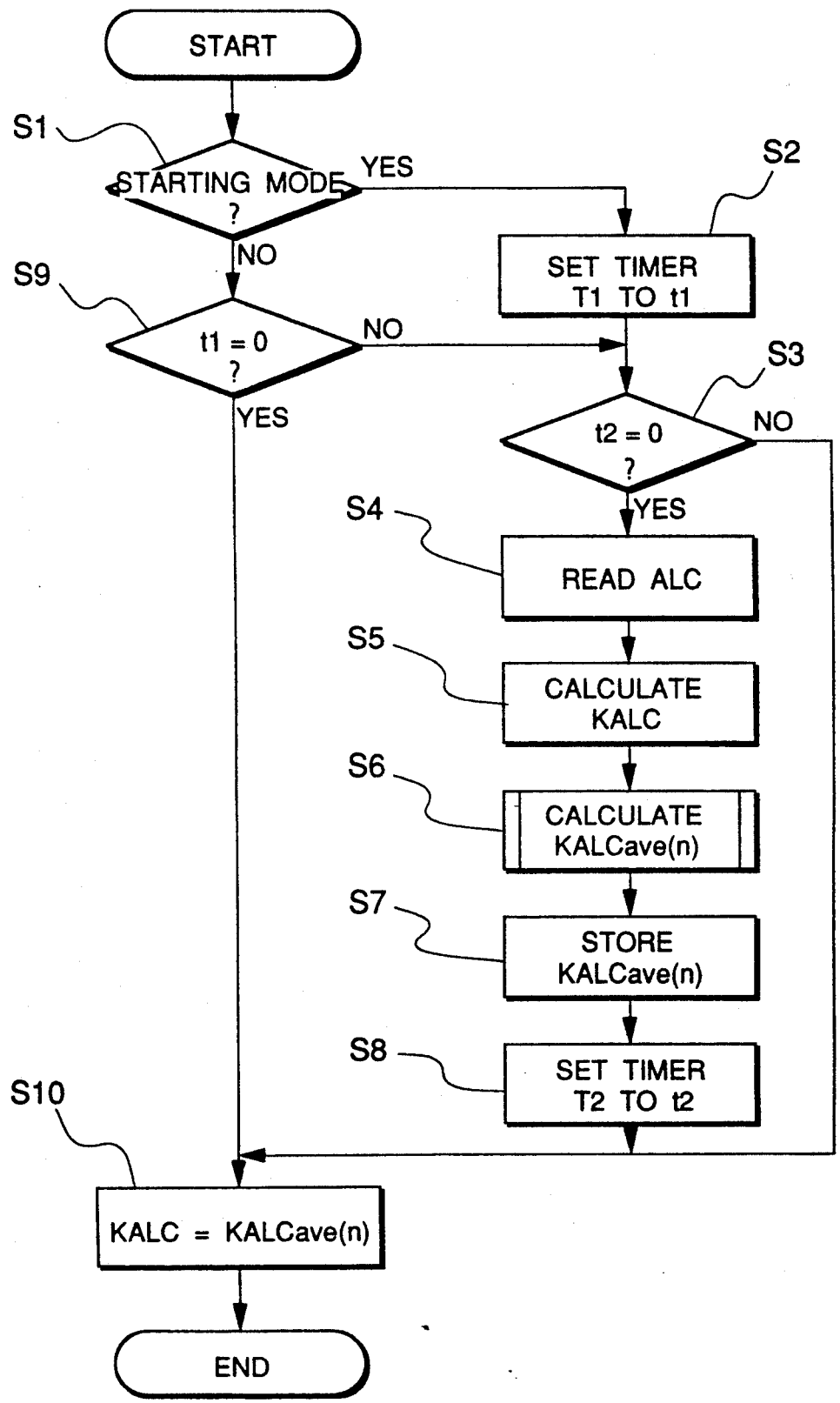
FIG. 3 is a flowchart of a program for calculating an alcohol concentration-dependent correction coefficient KALC according to a first embodiment of the invention.

FIG. 3 shows a program for calculating an average value KALCave of the correction coefficient KALC. This program is executed at predetermined time intervals (e.g. 2 millisec).

First, it is determined at a step S1 whether or not the engine is in the starting mode. This determination is carried out by determining whether or not a starter switch, not shown, of the engine is closed and at the same time the engine rotational speed NE is below a predetermined starting rotational speed (cranking speed).

In the first loop of execution of the program, the engine is in the starting mode, so that the program proceeds to a step S2 where a timer T1 is set to a predetermined time period (e.g. 90 seconds) and started for down-counting. The timer T1 is provided for setting a time period for executing calculation of the average value of the alcohol concentration-dependent correction coefficient KALC, immediately after the start of the engine. Then at a step S3, it is determined whether or not a count value t2 of a timer T2 is equal to 0. The timer T2 is provided for sampling a value of the alcohol concentration-dependent correction coefficient KALC every predetermined time period. In the first loop, the count value t2 of the timer T2 is equal to 0, and then the program proceeds to a step S4 where a value of the methanol concentration detected by the ALC sensor 12 is read and stored into the memory means 3c. Then at a step S5, a value of the correction coefficient KALC corresponding to the detected methanol concentration value is obtained from the KALCCR table. Since the engine is in the starting mode in this loop, the correction coefficient KALCCR is calculated as KALC by the use of the KALCCR table to be used when the engine is in the starting mode.

Then, the program proceeds to a step S6, where the average value KALCave (n) of the correction coefficient KALC is calculated by the use of the following equation (3):

$$KALCave(n) = (CKALC/256) \times KALC + [(256 - CKALC)/256] \times KALCave(n-1) \ldots (3)$$

where KALCave (n−1) represents an immediately preceding value of the average value KALCave obtained on the last occasion. In the first loop in the starting mode, it is replaced by a predetermined initial value KALCave (0).

CKALC represents an averaging coefficient which assumes different values depending upon whether the engine is in the starting mode or in the basic mode. Therefore, the average value KALCave (n) is calculated at different calculating speeds depending on the mode in which the engine is operating. In other words, an averaging coefficient CKALCCR used when the engine is in the starting mode is set to a value different from an averaging coefficient CKALCST used when the engine in the basic mode, to thereby change the speed of calculating the average value KALCave (n) of the correction coefficient KALC. More specifically, the averaging coefficient CKALCCR is set to a larger value than the averaging coefficient CKALCST, whereby the calculating speed for the average value KALCave (n) is made higher when the engine is in the starting mode than when the engine is in the basic mode to obtain the desired average value KALCave (n) more rapidly. The provision of two different values CKALCCR and CKALCST for the averaging coefficient CKALC is based on the following ground. When the engine is in the starting mode, there is a fear of fuel being not uniformly mixed in the fuel tank 16. Also, the blending ratio of components (methanol/gasoline ratio) of fuel refilled after stoppage of the engine can be different from that stored in the fuel tank 16 before the stoppage of the engine. In short, the concentration of alcohol in the fuel supplied to the engine can be different. Further, when the concentration of methanol is too high, the engine 1 cannot be started unless the amount of fuel supplied to the engine is increased. Therefore, when the engine is in the starting mode, the calculating speed for the average value KALCave (n) is increased to use a value thereof more rapidly reflecting the present concentration of methanol.

In this connection, when the starting mode is over, the air-fuel ratio is controlled to a stoichiometric air-fuel ratio in response to output from the $O_2$ sensor 23. Therefore, the average value KALCave (n) not so rapidly reflecting the present concentration of methanol can be used in calculating the amount of fuel supplied to the engine in the basic mode, with no problem.

Referring again to FIG. 3, the average value KALCave (n) of the correction coefficient KALC calculated as above is stored into the memory means 3c (backup RAM) at a step S7. Then, the timer T2 is set to a predetermined time period (e.g. 80 millisec.) and started for down-counting at a step S8. Then the program proceeds to a step S10 where the final value of the correction coefficient KALC is set to the average value KALCave at a step S10, followed by terminating the present program. This average value KALCave is applied to the aforementioned equation (1) as a value of KALCCR.

In the following loops, it is determined again at the step S1 whether or not the engine is in the starting mode. If the starting mode is over, the program proceeds to a step S9 where it is determined whether or not the count value t1 of the timer T1 is equal to 0. If the answer to this question is negative (NO), i.e. if it is determined that the count value t1 of the timer T1 is not equal to 0, the program proceeds to the step S3 where the count value t2 of the timer T2 set at the step S8 is equal to 0. If the answer to this question is negative (NO), i.e. if the count value t2 is not equal to 0, the program proceeds to the step S10 where the final value of the correction coefficient KALC is set to a value of the average value KALCave obtained in the preceding loop, followed by terminating the present program.

On the other hand, if the answer to the question of the step S3 is affirmative (YES) i.e. if the count value t2 of the timer T2 is equal to 0, the program proceeds in the same manner as in the starting mode to execute the steps of S4−S5− . . . S8−S10 in the mentioned order, followed by terminating the present program. On the first occasion after the starting mode is over, the last value of the average value KALCave obtained when the engine was in the starting mode is applied to KALCave (n−1) of the second order term on the right side of the equation (3). In addition, the averaging coefficient CKALC is set to a smaller value than when the engine is in the starting mode, as mentioned above.

In the following loops, if the answer to the question of the step S9 is affirmative (YES), i.e. if the count value t1 of the timer T1 set at the step S2 is equal to 0, it is judged that the fuel in the fuel tank 16 has already been uniformly mixed and hence fluctuation will no longer occur in the detected value of the methanol concentration, so that the program jumps to the step S10 where the final value of the correction coefficient KALC is set to the last value of the average value KALCave of the correction coefficient KALC obtained when the engine is in the basic mode, followed by terminating the present program. Thus, after the predetermined time period set to the timer T1 has elapsed, calculation of a new value of the average value KALCave of the correction coefficient KALC is inhibited, and the average value KALCave calculated and stored immediately before the predetermined time period elapsed is applied in calculating the fuel injection period TOUT thereafter, thus avoiding adverse effects of noise and drift on the calculation of the alcohol concentration-dependent correction coefficient KALC.

According to the invention, as described above, an average value of the alcohol concentration-dependent correction coefficient KALC is calculated depending on the operating mode of the engine to be used in calculating the amount of fuel supplied to the engine. Therefore, even if output from the alcohol concentration sensor fluctuates or is deviated from a proper value due to noise and drift, fluctuation of the correction coefficient KALC can be prevented, which enables to control the air-fuel ratio to the stoichiometric air-fuel ratio, thereby preventing degraded exhaust emission characteristics of the engine.

Further, according to the present embodiment, as described above, the calculation of the average value KALCave is effected when the engine is in the starting mode and before a predetermined time period elapses after the start of the engine. That is, the correction coefficient is averaged only when the engine is in the starting mode and within the predetermined time period after the start of the engine, which allows to omit unnecessary calculation of the average value after the fuel has been uniformly mixed, and hence simplify the calculation program.

Further, according to the present embodiment, the speed of calculating the average value is set to a higher value when the engine is in the starting mode in which the fuel has not been uniformly mixed than after completion of the start of the engine, to thereby obtain a value of the average value more rapidly reflecting the present value of the concentration of alcohol in the fuel, which enables to more promptly avoid degradation of the exhaust gas emission characteristics etc.

Next, a second embodiment of the invention will be described. In this embodiment, the central processing unit (CPU) 3b of the ECU 3 appearing in FIG. 1 further forms alcohol concentration change-determining means for determining whether or not the alcohol concentration detected by the ALC sensor 21 has changed after the predetermined time period elapsed after the start of the engine.

In the present embodiment, the alcohol concentration-dependent correction coefficient KALC is calculated according to a program shown in FIG. 4. This program is also executed at predetermined time intervals (e.g. 2 millisec).

First, at a step S101, it is determined whether or not an automotive vehicle on which the engine is installed is standing (e.g. the travelling speed of the vehicle is equal to or lower than 10 km/h). If the answer to this question is affirmative (YES), i.e. if it is determined that the vehicle is standing, a value of the alcohol concentration detected by the ALC sensor 21 is read via the input circuit 3a and stored into the memory means 3c at a step S102, and then a value of the correction coefficient KALC corresponding to the detected value of the alcohol concentration is calculated based on one of the correction coefficient KALC tables stored beforehand in the memory means 3c (ROM) which is selected depending on operating conditions of the engine, at a step S103.

Then, it is determined at a step S104 whether or not the engine is in the starting mode. This determination is carried out e.g. by determining whether or not the engine rotational speed NE is below a predetermined starting rotational speed (cranking speed). If the answer to this question is affirmative (YES), i.e. if it is determined that the engine is in the starting mode, the program enters an average value-calculating loop in the starting mode, and first at a step S105 the timer T1 is set to the predetermined time period (e.g. 90 seconds).

Then, at a step S106, it is determined whether or not the engine coolant temperature TW is high (e.g. equal to or higher than 95° C.). If the answer to this question is affirmative (YES), i.e. if it is determined that the engine coolant temperature TW is high, the program proceeds to a step S107 where a value CKALCCR2 suitable for restarting the engine at high engine temperature is used as the averaging coefficient CKALC to be applied to the equation (3), whereas if the answer is negative (NO), i.e. if it is determined that the engine coolant temperature TW is not high, the program proceeds to a step S108 where a value CKALCCR1 suitable for starting the engine at low engine temperature is used as same at a step S108. These values are in a relationship of CKALCCR2>CKALCCR1.

Then, a counter C1 is set to a predetermined number (e.g. 10) at a step 109, and a counter C2 is also set to a predetermined number (e.g. 30) at a step S109. The counters C1 and C2 are provided for executing the calculation of the alcohol concentration-dependent correction coefficient KALC at predetermined time intervals. At the following step S110, the average value KALCave of the correction coefficient KALC is calculated by the use of the aforementioned equation (3).

A value of the average value KALCAave of the correction coefficient KALC obtained at the step S110 is stored into the memory means 3c (backup RAM) at a step S111 in case of the ALC sensor 21 becoming faulty.

On the other hand, if the answer to the question of the step S104 is negative (NO), i.e. if it is determined that the engine is not in the starting mode, it is determined at a step S112 whether or not the count value of the timer T1 is equal to 0. If the answer to this question is negative (NO), i.e. if t1>0, the program enters an average value-calculating loop to be executed before the predetermined time period (i.e. 90 seconds) elapses after the start of the engine. First, at a step S113, it is determined whether or not the engine coolant temperature TW is high (e.g. equal to or higher than 95° C.). If the answer to this question is affirmative (YES), i.e. if it is determined that the engine coolant temperature is high, a value CKALCST2 suitable for engine operation at high engine temperature is used at a step S114 as the averaging coefficient CKALC to be applied to the equation (3), whereas if the answer is negative (NO), i.e. if it is determined that the engine coolant temperature TW is not high, a value CKALCST1 suitable for low engine temperature is used as same at a step S115. These values are in a relationship of CKALCST2>CKALCST1.

Then, the program proceeds to the step S109 where the counters C1 and C2 are set to the respective predetermined values, and then the average value KALCave is calculated by the use of the equation (3) at the step S110. A value of the average value KALCave obtained at the step S110 is stored into the memory means 3c (backup RAM) at the step S111.

If the answer to the question of the step S112 is affirmative (YES), i.e. if t1=0, the program proceeds to a step S116 where it is determined whether or not a count value t3 of a timer T3 is equal to 0. The timer T3 is provided for setting a time period for executing the calculation of the average value of the alcohol concentration-dependent correction coefficient KALC when the alcohol concentration is determined to have changed by more than a predetermined value after the predetermined time period (90 seconds) elapsed after the start of the engine. Before the timer T3 is set to a predetermined time period (e.g. 20 seconds), the count value thereof is equal to 0, so that in the present loop, the program proceeds to a step S117.

At the step S117, the count value c1 of the counter C1 is decreased by a decrement of 1, and it is determined at a step S118 whether or not the count value c1 of the counter C1 is equal to 0. If the answer to this question is negative (NO), i.e. if c1>0, the program proceeds to the step S111, whereas if the answer is affirmative (YES), i.e. if c1=0, the program enters an average value-recalculating loop to be executed after the predetermined time period (90 seconds) elapsed after the start of the engine. First, at a step S119, there is calculated an absolute value $\Delta KALC$ of the difference between the average value KALCave so far obtained and a value of KALC calculated from the KALC table according to a detected value of the alcohol concentration at the step S103 in the present loop. Then, it is determined at a step S120 whether or not the absolute value $\Delta KALC$ is equal to or larger than a predetermined reference value REF (a reference value for determining whether or not the average value KALCave of the alcohol concentration-dependent correction coefficient KALC should be calculated again after the predetermined time period elapsed after the start of the engine).

If the answer to this question is affirmative (YES), i.e. if $\Delta KALC \geq REF$, it is judged that the alcohol concentration has changed to such an extent as will affect the engine control, and then the program proceeds to a step S121 where the count value c2 of the counter C2 is decreased by a decrement of 1. Then, at a step S122, it is determined whether or not the count value c2 of the counter C2 is equal to 0. If the answer to this question is negative (NO), i.e. if c2 > 0, the program proceeds to the step S111, whereas if the answer is affirmative (YES), i.e. if c2 = 0, the program proceeds to a step S123 where the timer T3 is set to the predetermined time period (e.g. 20 seconds), followed by the program proceeding to the step S111.

In the next loop, the program proceeds through the steps S101 to S104 and the step 112, and it is determined at the step S116 that the count value t3 of the timer T3 is not equal to 0 since the timer T3 has already been set to the predetermined time period (e.g. 20 seconds) at the step S123 in the immediately preceding loop (i.e. the answer to the question of the step S116 is negative (NO)), followed by the program proceeding to a step S124, to determine whether or not the engine coolant temperature TW is high (e.g. equal to or higher than 95° C.). If the answer to this question is affirmative (YES), i.e. if it is determined that the engine coolant temperature is high, a value CKALCAST2 suitable for engine operation at high engine temperature is used at a step S125 as the average coefficient CKALC to be applied to the equation (3), whereas if the answer is negative (NO), i.e. if it is determined that the engine coolant temperature TW is not high, a value CKALCAST1 suitable for engine operation at low engine temperature is used as same at a step S126. These values are in a relationship of CKALCAST2 > CKALCAST1.

Then, the program proceeds to the step S109, where the counters C1 and C2 are set to the respective predetermined values, and then the average value KALCave is calculated by the use of the equation (3) at the step S110. The average value KALCave obtained at the step S110 is stored into the memory means 3c (backup RAM) at the step S111.

As described above, when the vehicle is in a standing state, the average value KALCave of the alcohol concentration-dependent correction coefficient KALC is calculated from values of the correction coefficient KALC obtained from the KALC tables according to the alcohol concentration detected by the ALC sensor 21 by the use of the equation (3), by way of three different loops: First, when the engine is in the starting mode, it is calculated in the average value-calculating loop in the starting loop (i.e. steps S101 to S111). Secondly, it is calculated in the average-value calculating loop to be executed before the predetermined time period (i.e. 90 seconds) elapses after the start of the engine (i.e. steps S101 to S104–S112 to S115–S109 to S111). Thirdly, it is calculated in the average value-recalculating loop to be executed after the predetermined time period (90 seconds) elapses after the start of the engine (i.e. steps S101 to S104–S112–S116 to S123–S111–S101 to S104–S1-12–S116–S124 to S126–S109 to S111). The newest value of the average value KALCave thus obtained is used as the final value of the alcohol concentration-dependent correction coefficient KALC in determining the fuel injection period $T_{OUT}$.

Therefore, it is possible to calculate the alcohol concentration-dependent correction coefficient KALC corresponding to the actual alcohol concentration in the fuel detected by the ALC sensor 21, and determine the fuel injection period $T_{OUT}$ by the use of the correction coefficient KALC, which ensures proper engine control responsive to the actual concentration of alcohol in the fuel supplied to the engine.

Further, in all of the above average value-calculating loops, it is determined whether or not the engine coolant temperature TW is high (e.g. equal to or higher than 95° C.) (at steps S106, S113, or S124). The averaging coefficient CKALC to be applied to the equation (3) has three different pairs of values used in the respective average value-calculating loops, each pair being composed of one value suitable for engine operation at high engine temperature and one value suitable for engine operation at low engine temperature, and the values of each pair are selected depending on the engine coolant temperature TW. One value of each pair suitable for engine operation at high engine temperature is set to a larger value than the other suitable for engine operation at low engine temperature to thereby cause the average value KALCave of the correction coefficient KALC to be calculated at a higher speed when the engine temperature is high than when the engine temperature is low.

The averaging coefficient CKALC is thus set to larger values for high engine temperature operation than those for low engine temperature operation for the following reason: The ALC sensor 21 is mounted in the wall of the fuel supply pipe 13. When the engine is restarted while it is very hot, the fuel supply pipe 13 is also very hot. Hot fuel remaining in the hot fuel pipe and heated thereby first flows through the fuel supply pipe 13 and then cold fuel which is newly supplied from the fuel tank flows through same. This difference in temperature of fuel causes the output level from the ALC sensor 21 to temporarily deviate from a proper level due to its temperature-dependent characteristics. Accordingly, a value of the alcohol concentration ALC detected by the ALC sensor 21 assumes a value slightly higher than the actual value of the alcohol concentration ALC. In view of this fact, depending on the engine coolant temperature TW (whether it is high or low), the averaging coefficient CKALC is selected (at steps S107, S108, S114, S115, S125, or S126) to thereby reduce adverse effects of deviation of the output level from the ALC sensor on the calculation of the correction coefficient KALC.

As described in detail heretofore, according to the present embodiment, when the alcohol concentration change-determining means determines that the alcohol concentration has changed after the predetermined time period elapsed after the start of the engine, the alcohol concentration-dependent correction coefficient is calculated again, which enables to obtain a value of the correction coefficient more accurately corresponding to the actual alcohol concentration.

Further, the averaging coefficient CKALC is set to different values depending on the engine coolant temperature TW, which enables to reduce adverse effects of deviation of the level of the output signal from the ALC sensor 21 on the calculation of the correction coefficient KALC.

Thus, the alcohol concentration-dependent correction coefficient can be calculated which properly corresponds to the actual alcohol concentration, to thereby enable to perform proper air-fuel ratio control, and hence avoid degraded exhaust emission characteristics.

What is claimed is:

1. An air-fuel ratio control system for an internal combustion engine using an alcohol blended fuel, comprising:

alcohol concentration-detecting means for detecting concentration of alcohol in said fuel;

correction coefficent-calculating means for calculating a correction coefficient for use in calculating an amount of fuel supplied to said engine, in response to said concentration of alcohol detected by said alcohol concentration-detecting means;

engine operating condition-detecting means for detecting operating conditions of said engine;

average value-calculating means for calculating an average value of said correction coefficient, depending on said operating conditions of said engine detected by said engine operating condition-detecting means; and air-fuel ratio control means for calculating said amount of fuel supplied to said engine by the use of said average value of said correction coefficient calculated by said average value-calculating means to thereby control the air-fuel ratio of an air-fuel mixture supplied to said engine.

2. An air-fuel ratio control system for an internal combustion engine according to claim 1, wherein said average value-calculating means calculates said average value of said correction coefficient when said engine is being started and before a predetermined time period elapses after said engine has been started.

3. An air-fuel ratio control system for an internal combustion engine according to claim 1 or 2, wherein said average value-calculating means calculates said average value of said correction coefficient at a calculating speed which is set to different values depending on whether said engine is being started or has been started.

4. An air-fuel ratio control system for an internal combustion engine according to claim 3, wherein said calculating speed of said average value of said correction coefficient is set to a higher value when said engine is being started than after said engine has been started.

5. An air-fuel ratio control system for an internal combustion engine according to claim 1, further including alcohol concentration change-determining means for determining whether or not said concentration of alcohol detected by said alcohol concentration-detecting means has changed after a predetermined time has elapsed after said engine was started, wherein when said alcohol concentration change-determining means determines that said concentration of alcohol has changed, said average value-calculating means calculates again said average value of said correction coefficient by the use of values of said correction coefficient calculated by said correction coefficient-calculating means in response to new values of said concentration of alcohol detected by said alcohol concentration-detecting means.

6. An air-fuel ratio control system for an internal combustion engine according to claim 5, wherein said alcohol concentration change-determining means determines that said concentration of alcohol has changed when a difference between a present value of said correction coefficient calculated by said correction coefficient-calculating means in response to a present value of said concentration of alcohol detected by said alcohol concentration-detecting means and said average value of said correction coefficient is equal to or larger than a predetermined value.

7. An air-fuel ratio control system for an internal combustion engine according to claim 6, wherein said alcohol concentration change-determining means finally determines that said concentration of alcohol has changed when said determination thereof has been repeated a predetermined number of times.

8. An air-fuel ratio control system for an internal combustion engine according to claims 1, 2, 5, 6, or 7, further including engine temperature-detecting means for detecting a temperature of said engine, wherein said calculating speed of said average value of said correction coefficient is changed depending on said temperature of said engine detected by said engine temperature-detecting means.

9. An air-fuel ratio control system for an internal combustion engine according to claim 3, further including engine temperature-detecting means for detecting a temperature of said engine, wherein said calculating speed of said average value of said correction coefficient is changed depending on said temperature of said engine detected by said engine temperature-detecting means.

10. An air-fuel ratio control system for an internal combustion engine according to claim 4, further including engine temperature-detecting means for detecting a temperature of said engine, wherein said calculating speed of said average value of said correction coefficient is changed depending on said temperature of said engine detected by said engine temperature-detecting means.

11. An air-fuel ratio control system for an internal combustion engine according to claim 8, wherein said calculating speed of said average value of said correction coefficient is set to a higher value when said temperature of said engine detected by said engine temperature-detecting means is equal to or higher than a predetermined value than when said temperature of said engine is lower than said predetermined value.

12. An air-fuel ratio control system for an internal combustion engine according to claim 9, wherein said calculating speed of said average value of said correction coefficient is set to a higher value when said temperature of said engine detected by said engine temperature-detecting means is equal to or higher than a predetermined value than when said temperature of said engine is lower than said predetermined value.

13. An air-fuel ratio control system for an internal combustion engine according to claim 10, wherein said calculating speed of said average value of said correction coefficient is set to a higher value when said temperature of said engine detected by said engine temperature-detecting means is equal to or higher than a predetermined value than when said temperature of said engine is lower than said predetermined value.

14. An air-fuel ratio control system for an internal combustion engine according to claim 8, wherein said temperature of said engine is detected by an engine coolant temperature sensor for detecting the temperature of coolant in said engine.

15. An air-fuel ratio control system for an internal combustion engine according to claim 9, wherein said temperature of said engine is detected by an engine coolant temperature sensor for detecting the temperature of coolant in said engine.

16. An air-fuel ratio control system for an internal combustion engine according to claim 10, wherein said temperature of said engine is detected by an engine coolant temperature sensor for detecting the temperature of coolant in said engine.

17. An air-fuel ratio control system for an internal combustion engine according to claim 11, wherein said temperature of said engine is detected by an engine coolant temperature sensor for detecting the temperature of coolant in said engine.

18. An air-fuel ratio control system for an internal combustion engine according to claim 12, wherein said temperature of said engine is detected by an engine coolant temperature sensor for detecting the temperature of coolant in said engine.

19. An air-fuel ratio control system for an internal combustion engine according to claim 13, wherein said temperature of said engine is detected by an engine coolant temperature sensor for detecting the temperature of coolant in said engine.

* * * * *